(12) United States Patent     (10) Patent No.: US 12,304,663 B2
Yost     (45) Date of Patent: May 20, 2025

(54) SYSTEM AND METHOD FOR A STRATOSPHERIC AIRCRAFT

(71) Applicant: Thomas F. Yost, Chesapeake Beach, MD (US)

(72) Inventor: Thomas F. Yost, Chesapeake Beach, MD (US)

( * ) Notice: Subject to any disclaimer, the term of this patent is extended or adjusted under 35 U.S.C. 154(b) by 0 days.

(21) Appl. No.: 18/663,365

(22) Filed: May 14, 2024

(65) Prior Publication Data

US 2024/0375792 A1    Nov. 14, 2024

Related U.S. Application Data

(60) Provisional application No. 63/466,327, filed on May 14, 2023.

(51) Int. Cl.
| | | |
|---|---|---|
| *B64G 1/00* | (2006.01) | |
| *B64B 1/08* | (2006.01) | |
| *B64B 1/30* | (2006.01) | |
| *B64G 1/40* | (2006.01) | |
| *B64G 1/64* | (2006.01) | |
| *B64G 4/00* | (2006.01) | |

(52) U.S. Cl.
CPC ................ *B64G 1/005* (2013.01); *B64B 1/08* (2013.01); *B64B 1/30* (2013.01); *B64G 1/008* (2023.08); *B64G 1/40* (2013.01); *B64G 1/6462* (2023.08); *B64G 4/00* (2013.01); *B64G 2004/005* (2013.01)

(58) Field of Classification Search
CPC .......... B64G 1/005; B64G 1/008; B64G 1/40; B64G 1/6462; B64G 4/00; B64G 2004/005; B64B 1/08; B64B 1/30; B64B 1/22; B64B 1/40; B64B 1/58; B64B 1/62
See application file for complete search history.

(56) References Cited

U.S. PATENT DOCUMENTS

| | | |
|---|---|---|
| 9,139,279 B2 | 9/2015 | Heppe |
| 10,982,926 B2 | 4/2021 | Hartman et al. |
| | (Continued) | |

FOREIGN PATENT DOCUMENTS

JP     2021017224 A    *   2/2021

OTHER PUBLICATIONS

Toral. "Mechanical Design of Superconducting Accelerator Magnets." arXiv:1501.02932 [physics.acc-ph] (Jan. 13, 2015).

(Continued)

*Primary Examiner* — Valentina Xavier
(74) *Attorney, Agent, or Firm* — Jessica Smith; LOZA & LOZA, LLP

(57) ABSTRACT

An airship includes a capsule and an external structure attached to the capsule and extending vertically above an upper portion of the capsule. A plurality of gas balloons are secured to the external structure and hold a lighter-than-air lifting gas. The volume of lifting gas in the plurality of balloons is at least a sufficient volume to lift the airship into the stratosphere. The airship may also include a first boom and second boom that extend horizontally outward from a lower portion of the capsule. The booms each include a weight or cargo container at a far end to assist in balancing and stabilizing the airship. The number and/or the sizes of the gas balloons may be adjusted and configured to obtain the volume of lifting gas needed to lift the airship to a desired altitude above the Earth.

20 Claims, 12 Drawing Sheets

(56) References Cited

U.S. PATENT DOCUMENTS

| | | |
|---|---|---|
| 11,155,328 B1* | 10/2021 | Hong ........................ B64B 1/62 |
| 2015/0203184 A1 | 7/2015 | Sarmiento |
| 2016/0288894 A1 | 10/2016 | Sehnert et al. |
| 2022/0127017 A1* | 4/2022 | Takács ................... B64G 1/005 |
| 2022/0177157 A1* | 6/2022 | Benedetto ................. B64F 1/14 |

OTHER PUBLICATIONS

Corresponding PCT/US2024/029236. International Search Report & Written Opinion (Aug. 20, 2024).

* cited by examiner

SYSTEM AND METHOD FOR A STRATOSPHERIC AIRCRAFT

CROSS REFERENCE TO RELATED APPLICATIONS

U.S. patent application Ser. No. 18/663,335 filed May 14, 2024 entitled, "SYSTEM AND METHOD FOR A SUPER-CONDUCTIVE, ELECTROMAGNETIC LAUNCHER", by inventor Thomas F. Yost, the entirety of which is incorporated by reference herein.

U.S. patent application Ser. No. 18/664,116 filed May 14, 2024 entitled, "SYSTEM AND METHOD FOR DIMPLED SPHERICAL STORAGE UNITS," by inventor Thomas F. Yost, the entirety of which is incorporated by reference herein.

U.S. patent application Ser. No. 18/663,355 filed May 14, 2024 entitled, "SYSTEM AND METHOD FOR A SPACE-CRAFT DOCKING STATION," by inventor Thomas F. Yost, the entirety of which is incorporated by reference herein.

U.S. Patent Application No. entitled, "SYSTEM AND METHOD FOR SMART SPHERICAL CLUSTER VESSELS," by inventor Thomas F. Yost, the entirety of which is incorporated by reference herein.

FIELD

This application relates to systems and methods for a stratospheric aircraft and more specifically, a stratospheric airship using lighter than air gas for buoyancy.

BACKGROUND

The use of rockets is the prominent means to launch cargo, such as satellites and supplies, as well as humans into space. However, rockets have significant environmental implications. Rockets emit a large amount of greenhouse gases, such as carbon dioxide and water vapor, directly into the upper atmosphere. Additionally, the production and handling of rocket fuels, particularly highly toxic substances like hydrazine and nitrogen tetroxide, pose serious environmental risks. Their potential leakage or accidental release during launch preparations or failures can lead to soil and water contamination, as well as harm to ecosystems. Moreover, the depletion of the ozone layer caused by rocket emissions and the subsequent increase in ultraviolet radiation reaching the Earth's surface is an alarming consequence. The rocket fuel and emissions thus not only pose a threat to human health and wildlife but also contributes to global climate change.

Ethically, the use of rockets for space cargo and satellite launch also raises concerns due to the growing problem of space debris. The presence of space debris in Earth's orbit, as a result of defunct satellites and spent rocket stages, poses risks to operational satellites and spacecraft, as well as astronaut safety. The accumulation of space debris not only obstructs future space missions but also endangers the sustainability of space activities.

One alternative technology to rockets includes electromagnetic (EM) launchers that convert electrical energy into mechanical propulsion to launch objects into space from the ground. However, these known EM launchers require lengthy barrels that must withstand extremely high forces to launch objects into orbit from the ground, leading to reliability and integrity problems. In addition, the EM launchers require large capacitor banks to provide the necessary power. These factors hinder the use of known EM launchers in confined areas with limited power storage.

In view of the above disadvantages and others described in this specification, improved technologies for reusable space launch systems and aircraft are needed that reduce costs, power, and environmental concerns.

SUMMARY

In one aspect, an airship includes a capsule with at least a first boom extending substantially horizontally outward from a lower portion of a first side of the capsule and a first outrigger positioned at or near a far end of the first boom. At least a second boom extends substantially horizontally outward from a lower portion of a second, opposite side of the capsule, wherein the second boom is parallel to the first boom. A second outrigger is positioned at or near a far end of the second boom, wherein the first outrigger and the second outrigger hold cargo. An external structure is attached to the capsule and extend vertically above an upper portion of the capsule. A plurality of gas balloons secured externally to the external structure, wherein the plurality of gas balloons hold a lighter-than-air lifting gas and include at least a predetermined volume of the lifting gas to lift the airship into a predetermined altitude above Earth.

In another aspect, a stratospheric airship includes a launch system for launching one or more vessels. The airship includes a capsule, wherein the capsule holds the launch system for launching the one or more vessels. The airship includes an external structure attached to the capsule and extending vertically above an upper portion of the capsule, wherein an interior of the external structure forms an open air shaft from the capsule to the atmosphere. A plurality of gas balloons are secured externally to the external structure and extend outward from the external structure. The plurality of gas balloons hold a lighter-than-air lifting gas and a number and a size of the plurality of balloons are configured to include at least a sufficient volume of the lifting gas to lift the airship into an altitude of at least 12 kilometers (km).

In one or more of the above aspects, a number and/or a size of the plurality of gas balloons is adjustable to obtain the predetermined volume of lifting gas sufficient to lift the airship into the predetermined altitude above the Earth.

In one or more of the above aspects, an average density of the lifting gas in the plurality of gas balloons is a same density as air in the stratosphere and generate a float altitude of the airship in the stratosphere above the Earth.

In one or more of the above aspects, the airship includes at least a third boom extending substantially horizontally outward from a lower portion of a third side of the capsule, wherein the third boom is perpendicular to the first boom and the second boom. A third outrigger is positioned at or near a far end of the third boom. At least a fourth boom extends horizontally outward from a lower portion of a fourth side, opposite to the third side of the capsule, wherein the fourth boom is perpendicular to the first boom and the second boom and parallel to the third boom. A fourth outrigger is positioned at or near a far end of the second boom.

In one or more of the above aspects, the airship includes at least one tiltrotor propeller configured to tilt in one or more directions to steer the airship.

In one or more of the above aspects, the external structure includes a plurality of stanchions, each including a first end attached to and supported by the capsule, wherein the plurality of stanchions extend vertically above the upper portion of the capsule. A top ring is positioned above the capsule and supported by a second end of the plurality of stanchions.

In one or more of the above aspects, the external structure includes a plurality of ropes, each with a first end supported and attached to the top ring and a second end attached to the capsule. The plurality of gas balloons are coupled to the plurality of ropes and/or the plurality of stanchions and extend externally outward from the external structure.

In one or more of the above aspects, a length that the first boom extends horizontally outward from the lower portion of the first side of the capsule may be adjusted by sliding the first boom towards or away from the second boom.

In one or more of the above aspects, the first boom and the second boom are a same structure and/or are attached.

In one or more of the above aspects, the capsule includes a lower portion and an upper portion, wherein the upper portion is configured to open and expose an internal portion of the capsule.

In one or more of the above aspects, the internal portion of the capsule includes a launching system for launching a vessel from the airship.

In one or more of the above aspects, the launch system for launching the vessel, includes a plurality of cylinders that form a continuous guideway, wherein each of the plurality of cylinders include at least one lobe and one overlapping portion, wherein the at least one lobe of each of the plurality of cylinders are substantially aligned. The launch system also includes a plurality of coils that comprise one or more superconducting materials, wherein the plurality of coils are positioned externally to a bore in the guideway and configured to generate a magnetic field within the bore that levitates and propels the vessel within the bore. A cooling system is configured to cool the plurality of coils to or below a transition temperature at which the one or more superconducting materials in the plurality of coils transition to a superconducting state.

In one or more of the above aspects, one or more of the plurality of coils include propulsion coils that include the one or more superconducting materials, wherein the propulsion coils are configured to generate a magnetic field at a predetermined position in the bore to accelerate the vessel.

In one or more of the above aspects, the launch system includes at least one exit hatch for launching the vessel from the launch system, wherein the at least one exit hatch is positioned to launch the vessel internally through an open shaft formed by the external support and shielded by the plurality of gas balloons.

In one or more of the above aspects, at least a first boom extends substantially horizontally outward from a lower portion of a first side of the capsule and a first outrigger is positioned at or near a far end of the first boom, wherein the first outrigger holds at least a first vessel. At least a second boom extends substantially horizontally outward from a lower portion of a second, opposite side of the capsule, and a second outrigger is positioned at or near a far end of the second boom, wherein the second outrigger holds at least a second vessel.

In one or more of the above aspects, the first boom includes a first pathway from the first outrigger to the capsule, and the second boom includes a second pathway from the second outrigger to the capsule.

In one or more of the above aspects, the capsule includes a lower portion and an upper portion, wherein the upper portion is configured to open and expose an internal portion of the capsule including the launch system.

DETAILED DESCRIPTION

The word "exemplary" or "embodiment" is used herein to mean "serving as an example, instance, or illustration." Any implementation or aspect described herein as "exemplary" or as an "embodiment" is not necessarily to be construed as preferred or advantageous over other aspects of the disclosure. Likewise, the term "aspects" does not require that all aspects of the disclosure include the discussed feature, advantage, or mode of operation.

Embodiments will now be described in detail with reference to the accompanying drawings. In the following description, numerous specific details are set forth in order to provide a thorough understanding of the aspects described herein. It will be apparent, however, to one skilled in the art, that these and other aspects may be practiced without some or all of these specific details. In addition, well known steps in a process may be omitted from flow diagrams and descriptions presented herein in order not to obscure the aspects of the disclosure. Similarly, well known components in a device or well-known systems may be omitted from figures and descriptions thereof presented herein in order not to obscure the aspects of the disclosure.

Airships are a type of aircraft that generate lift from a volume displacement of surrounding air with a lighter than air, lifting gas (usually helium due to its lower flammability compared to hydrogen). There are several types of airships: rigid, semi-rigid and non-rigid. Rigid airships include a structural framework usually covered in fabric containing a number of gasbags or cells for the lifting gas. A semi-rigid airship is an airship which has a stiff keel or truss supporting the main envelope along its length. The keel may be partially flexible or articulated and may be located inside or outside the main envelope. The outer shape of the airship is maintained by gas pressure, as with the non-rigid "blimp".

A non-rigid airship or blimp does not have an internal structural framework. Unlike semi-rigid and rigid airships, blimps rely solely on the pressure of the lifting gas inside an envelope or hull to maintain the shape of the hull. Since blimps maintain their shape with internal overpressure, typically the only solid parts are the passenger car (or gondola) and the tail fins. Blimps are the most commonly built airships today because they are relatively easy to build and easy to transport once deflated.

A problem with currently known blimps is that due to their unstable hull, their size is limited. A blimp with too long a hull may kink in the middle when the overpressure is insufficient or when maneuvered too fast (this kinking also happened with semi-rigid airships with weak keels). Since the size of the hull is limited, the volume of lifting gas is limited which limits the weight of cargo that a blimp can carry.

Overview

Figure 1:
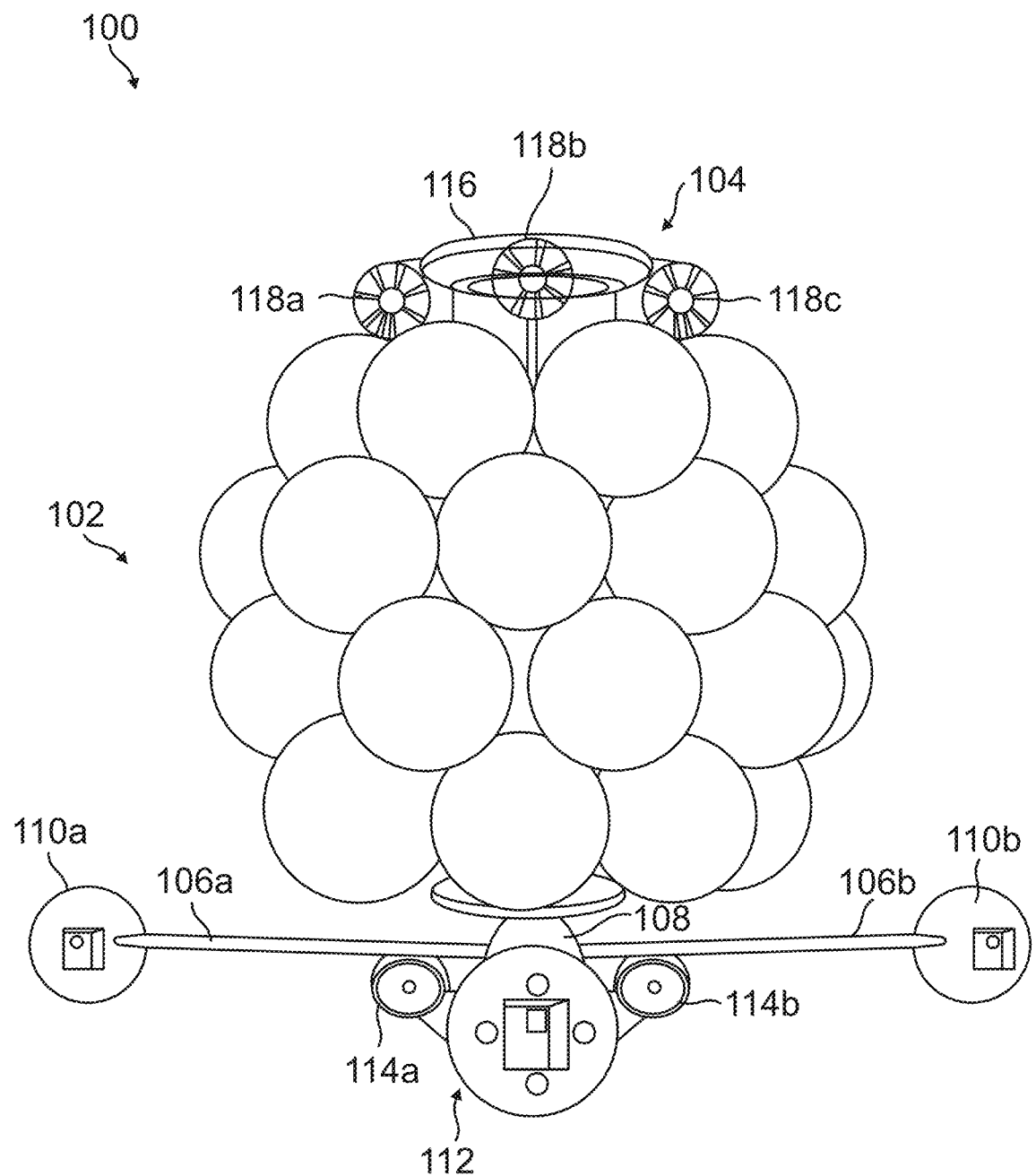
FIG. 1 illustrates an elevational view of an exemplary embodiment of an airship.

FIG. 1 illustrates an elevational view of an exemplary embodiment of an airship 100. In this example, the airship 100 is unmanned though in other embodiments, the airship 100 may be manned. The airship 100 includes a plurality of gas bags or balloons 102 secured to an external support or structure 104. The external structure 104 includes a top ring 116 supported by rigid poles that is attached to a lower platform 108. The top ring 116 may support one or more propellers 118a-c whose angle and/or speed may be adjusted for maneuverability and/or stability of the airship 100.

The airship 100 includes two or more booms 106a-b that extend substantially horizontally outward from the lower platform 108 (e.g., at an angle of +/−45 degrees from horizontal). The booms 106a-b are positioned substantially underneath the plurality of gas balloons 102 to provide stability and balance to the airship 100. The booms 106a-b may be a single structure extending through the lower platform 108 or may be two separate structures individually attached to the lower platform 108. An outrigger 110a-b is positioned at or near the far ends of each of the booms 106a-b. The outriggers 110a-b may include cargo or other weight to provide counterbalance and stability to the external structure 104 and the gas balloons 102. A fuselage 112 is positioned below the booms 106a-b and may include cargo, fuel, flight controls, wireless transmitters, etc. The fuselage 112 may also be configured for a manned flight, e.g., with pressurization, oxygen, etc. One or more tiltrotor propellers 114a-b are positioned on either side of the fuselage 112 and may be tilted downward to provide an upward thrust to propel the airship 100 to higher altitudes. The tiltrotor propellers 114a-b may also be tilted or angled from side to side to steer the airship 100. The tiltrotor propellers 114a-b may be powered using solar power, batteries, a generator on the airship 100 or other power source.

Since the gas balloons 102 are secured to the external structure 104, the gas balloons 102 are not limited in their overall volume and size, as with the hull of a blimp. The number and/or size of the gas balloons may be adjusted and configured to obtain a selected float altitude and/or flight time. The gas balloons 102 may comprise an expandable material to accommodate an increase in volume of the lifting gas at high altitudes. In addition or alternatively, the gas balloons 102 may have no or limited expansion capability, and the airship 100 may start a flight with its gas balloons 102 underinflated such that as the airship 100 gains height, the lifting gas has more expansion area as the surrounding atmospheric pressure reduces. The tiltrotors 114a-b may assist in providing lift to gain sufficient altitude for the gas balloons 102 to expand and be able to maintain altitude without the additional upward thrust. In one example, the gas balloons 102 may comprise strips of high-performance polyethylene film though other materials may be used.

The plurality of gas balloons 102 are filled with a lifting gas, such as helium, that is less dense than air and so generate aerostatic or buoyancy lift. In one embodiment, the gas balloons 102 are collectively filled with a volume of lifting gas sufficient to lift the airship 100 into the stratosphere, e.g., 12 kilometers (km) to 50 km in altitude and have a neutral buoyancy in the stratosphere. The gas balloons 102 are entirely sealed and maintain a higher pressure inside, allowing it to maintain its operational altitude despite temperature changes that occur day and night. The balloons 102 may be launched partially filled with helium, and as the balloons 102 ascend and ambient air pressure decreases, the helium expands to fill the balloons 102, until the airship 100 reaches its desired float altitude. The top or float altitude is determined when the average density of the lifting gas in the gas balloons 102 is the same as the density of the surrounding atmosphere. So the volume of lifting gas in each of the gas balloons 102 and/or the number of balloons 102 may be adjusted to obtain an average density of the lifting gas equal to a density of air in the stratosphere or other desired altitude.

By positioning the gas balloons 102 external to the airship 100, the number of gas balloons 102 and so the volume of lifting gas, may be selected to obtain a selected float altitude. For example, in one documented flight of the Red Bull® Stratos, one ballon with an approximate volume of 835,000 cubic meters (m3) filled with 5,000 m3 of helium on the ground was used to carry 1,360 kilograms (kg) to about an altitude of 40 km. Instead of one balloon, the airship 100 may include ten gas balloons 102 with an approximate volume of 83,500 m3 to carry a 1,360 kg load to the stratosphere, or twenty gas balloons 102 with an approximate volume of 41,750 m3 or forty gas balloons 102 with an approximate volume of 20,875 m3 to carry the 1,360 kg load to the stratosphere. The number and/or volume of the gas balloons 102 may thus be adjusted to obtain at least the lift necessary to reach the stratosphere or other selected altitude with a cargo of a predetermined weight. In addition, the plurality of gas balloons 102 may each have the same dimensions or may have multiple different dimensions.

The airship 100 has multiple components to aid in stabilization. For example, upper propellers 118a-c are positioned on or near the top ring 116 substantially above the gas balloons 102 to counterbalance the forces of wind. In response to a wind from the east, the upper propellers 118 facing west on the ring 116 may be activated or their speed increased. Additionally, the weight of the outriggers 110a-b acts as a ballast to counterbalance wind or other forces exerted on the gas balloons 102. The airship 100 may also implement a gyroscopic stabilizer control system that measures angular velocity and automatically adjusts the upper propellers 118a-c, the tiltrotor propellers 114a-b, vanes (not shown), or other stabilizers.

Embodiments of the Airship

Figure 2:
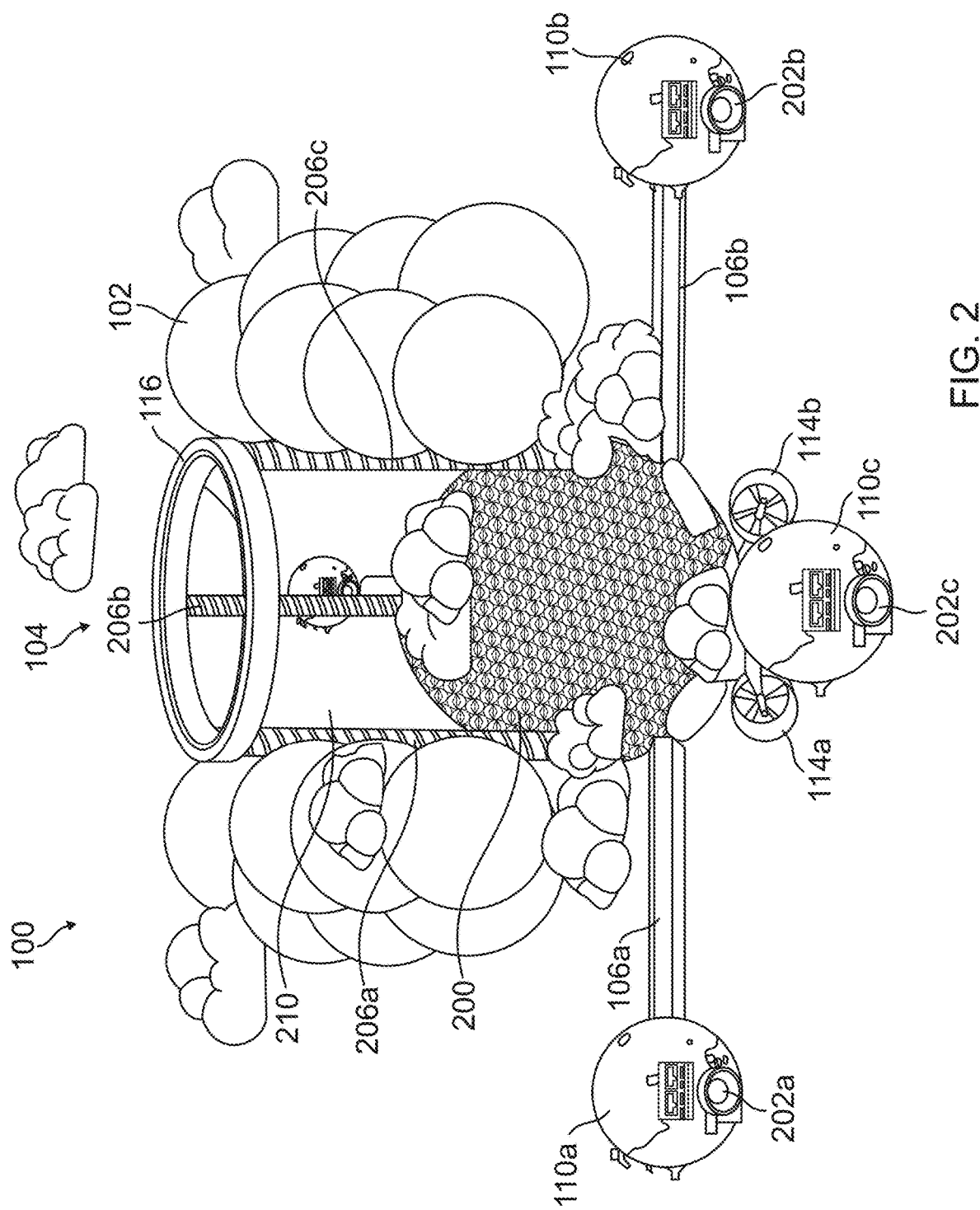
FIG. 2 illustrates an elevational view of another exemplary embodiment of the airship with the external structure exposed for illustration purposes.

FIG. 2 illustrates an elevational view of another exemplary embodiment of the airship 100 with the external structure 104 exposed. In this embodiment, the airship 100 includes a capsule 200 positioned substantially above four booms 106a-b, though only two are visible in this angle of the illustration. The booms 106a-b in this example are connected to the capsule 200. The booms 106a-b may be a single structure extending through the capsule 200 or may be two separate structures individually attached to the capsule 200. An outrigger 110a-c is positioned at or near the far ends of each of the booms 106a-b and may include a loading port 202a-c. The booms 106a-b and outriggers 110a-c are positioned substantially underneath the plurality of gas bags 102 to provide stability and balance to the airship 100, especially in the high winds of the stratosphere that may reach 70 meters per second (m/s).

The external structure 104 includes a plurality of stanchions 206a-c having a first end attached to and supporting the top ring 116 and a second end attached to the capsule 200. The stanchions 206a-c are made from a high strength material, such as carbon fiber or steel. The stanchions 206a-c form an internal, open air shaft 210 between the capsule 200 and a center opening of the top ring 116. Though three stanchions 206a-c are illustrated, additional or fewer stanchions 206a-c may be implemented. The plurality of gas balloons 102 are positioned externally to this open air shaft 210 to provide an unobstructed pathway from the capsule 200 through the open air shaft 210 to the atmosphere.

Figure 3:
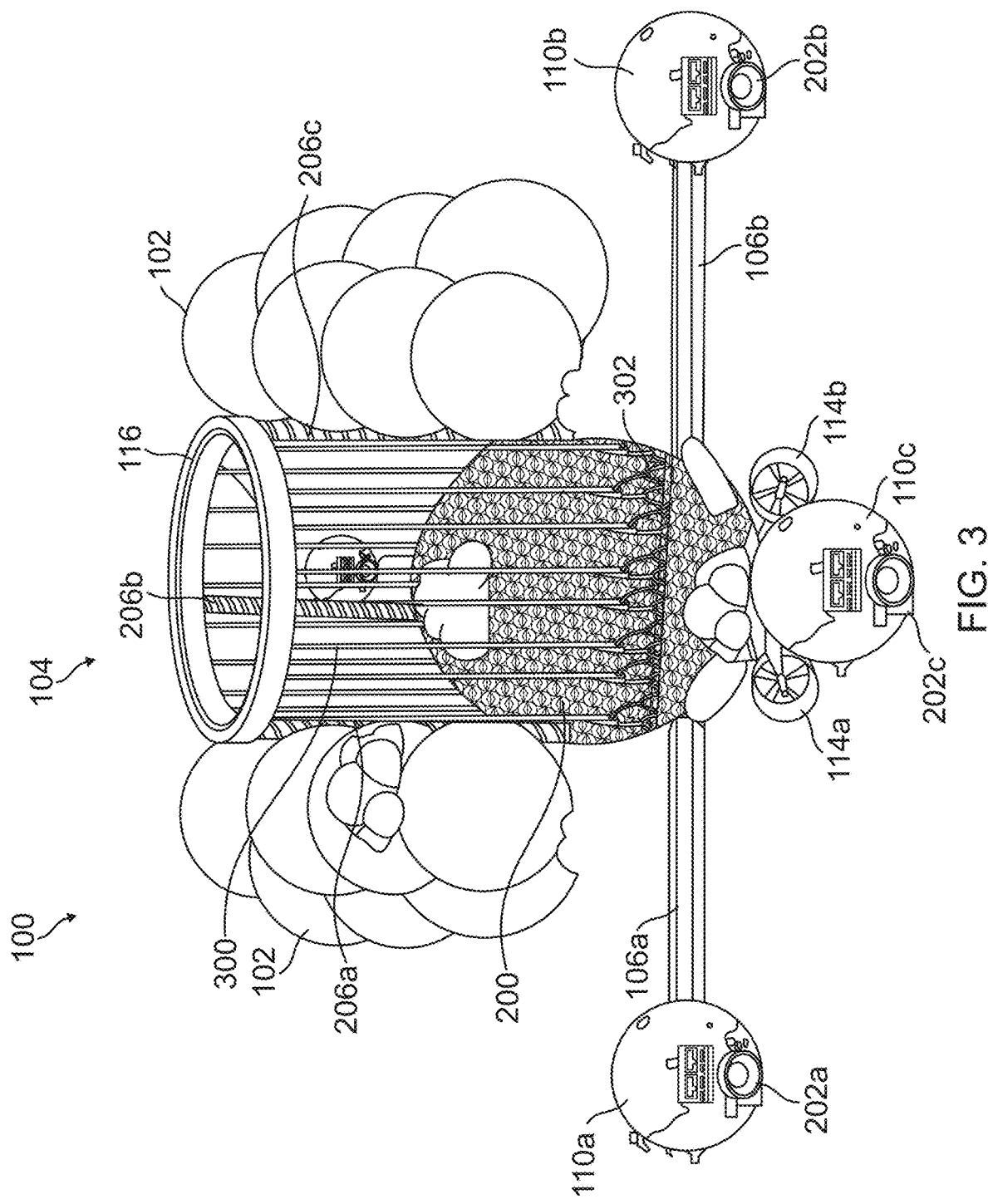
FIG. 3 illustrates another elevational view of an exemplary embodiment of the airship with the external structure exposed for illustration purposes.

FIG. 3 illustrates another elevational view of an exemplary embodiment of the airship 100 with the external structure 104 exposed. In this embodiment, a plurality of ropes 300 are tightly strung between and supported by the top ring 116 and the capsule 200. The ropes 300 may be a kernmantle rope including a nylon material. In another example, the ropes 300 may comprise metallic cables. The ropes 300 are secured to the capsule 200 using cleats 302 embedded into the capsule 200 or other attachment means. Though not shown, the plurality of gas balloons 102 are secured to the ropes 300 and/or the stanchions 206a-c of the external structure 104, e.g., using kernmantle ropes or metallic cables.

The capsule 200 is illustrated as a spherical structure with a dimpled surface. However, the capsule 200 may be other shapes or sizes and include different surface textures. The capsule 200 may include cargo for weather monitoring, surveillance, telecommunications, humanitarian aid, etc. In one embodiment, the capsule 200 includes a superconductive, electromagnetic launcher, such as described in U.S. patent application Ser. No. 18/663,335, filed May 14, 2024, entitled, "SYSTEM AND METHOD FOR A SUPERCONDUCTIVE, ELECTROMAGNETIC LAUNCHER", by inventor Thomas F. Yost, the entirety of which is incorporated by reference herein.

Figure 4:
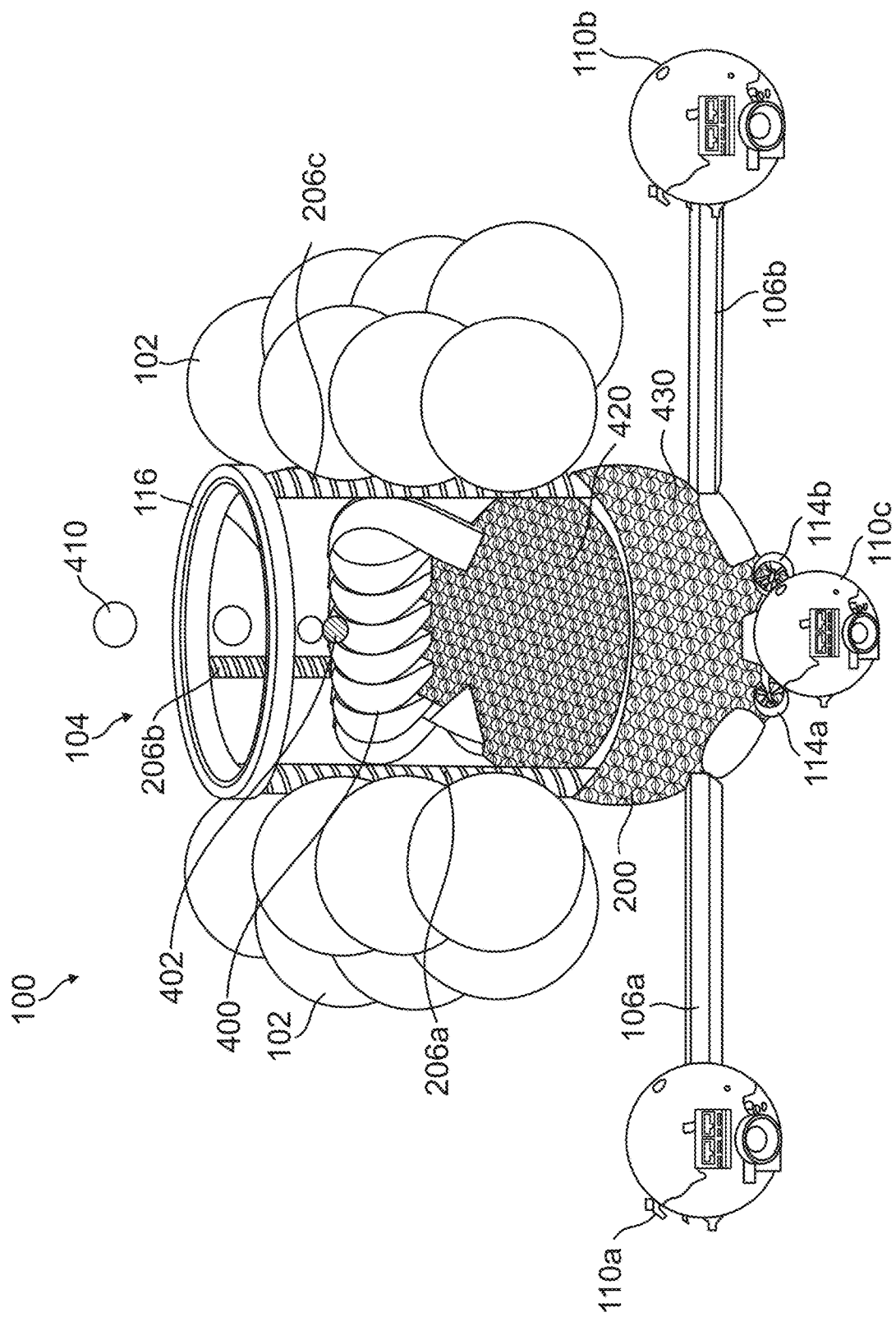
FIG. 4 illustrates an exemplary embodiment of a launch system implemented in the capsule of the airship.

FIG. 4 illustrates an exemplary embodiment of a launch system 400 implemented in the capsule 200 of the airship 100. The launch system 400 is integrated with and/or implemented in the capsule 200 and includes an electromagnetic, superconductive guideway formed by a plurality of cylinders. Superconducting magnets are spaced throughout the guideway and generate powerful magnetic fields to levitate and/or propel a vessel 410 through a bore of the guideway. The magnetic fields accelerate the vessel through the guideway in a controlled process until the vessel reaches a predetermined velocity, such as Mach 2.5 to Mach 5.0. An exit hatch 402 is then opened in the guideway, and the vessel 410 is launched from the airship 100 at a preconfigured flight trajectory.

In an embodiment, the predetermined velocity is a velocity sufficient for the vessel 410 to reach space. This velocity may be determined using one or more factors such as an altitude of the airship 100, air pressure, temperature, wind speed, trajectory of the vessel 410, or use of thrusters on the vessel 410. This velocity for the vessel 410 to reach space is far less than for rockets or other projectiles fired from the ground because the airship 100 launches the vessel from the stratosphere. For example, when the airship 100 is at an altitude of 40 km, only an additional 40 km to 60 km more are needed for the vessel 410 to reach space. In one embodiment, the vessel 410 may be equipped with a propulsion system, such as thrusters, to obtain additional velocity and/or for maneuvering in the stratosphere or space.

The airship 100 and launch system 400 may be reused for multiple missions/flights and multiple vessels 410 may be launched during the same mission/flight of the airship 100. This reuse reduces the space debris left by traditional rockets from single use rocket stages. The airship 100 and launch system 400 also do not release dangerous emissions into the atmosphere. The system thus decreases the environmental impact in comparison to traditional rocket launchers that emit a large amount of greenhouse gases, such as carbon dioxide and water vapor, directly into the upper atmosphere. In addition, the design of the launch system 400 on the stratospheric airship 100 requires less power to launch the vessels 410 into orbit in comparison to traditional gun rails or other known launchers positioned on the ground. The configuration of the plurality of cylinders in the guideway of the launch system 400 also requires less space and so fit within the confined areas of the airship 100.

The capsule 200 includes a lower portion 430 that supports the external structure 104 and an upper portion 420 that may be opened to expose an internal portion of the capsule 200 including the launcher 400. For example, the upper portion 420 may be retractable partially or substantially into the lower portion 430 or connected to the lower portion with hinges on a first side such that a second side may be raised using hydraulics. In another example, the upper portion 420 may include wheels on an undercarriage that rotate within a slide positioned on the lower portion 430 to move the upper portion 420 horizontally. Once the upper portion 420 is opened, the launch system 400 may be elevated, e.g., on a platform using hydraulics to prepare for launch. In launch position, the launch system 400 includes an exit hatch 402 positioned to launch the vessels 410 into the open air shaft 210.

As the airship 100 ascends to the stratosphere, the launch system 400 is sealed or cocooned in the capsule 200. When the airship 100 reaches its selected altitude, then the upper portion 420 of the capsule 200 is opened, and the launch system 400 is deployed. The gas balloons 102, ring 116, and stanchions 206 also shield the open bore or shaft 210 formed in the center of the external structure 104. This shields the vessel 410 after launch and before exiting the ring 116. The shielded open shaft 210 also provides scalability with the number of gas balloons since there is no hull or lining as with traditional dirigibles or blimps. The launch system 400 is able to launch a vessel 410 from within the capsule 200 through the open shaft 210 allowing for an almost unlimited number or size of gas balloons 102 around the outside of the external structure 104.

Exemplary Embodiments of the Launch System

Figure 5:
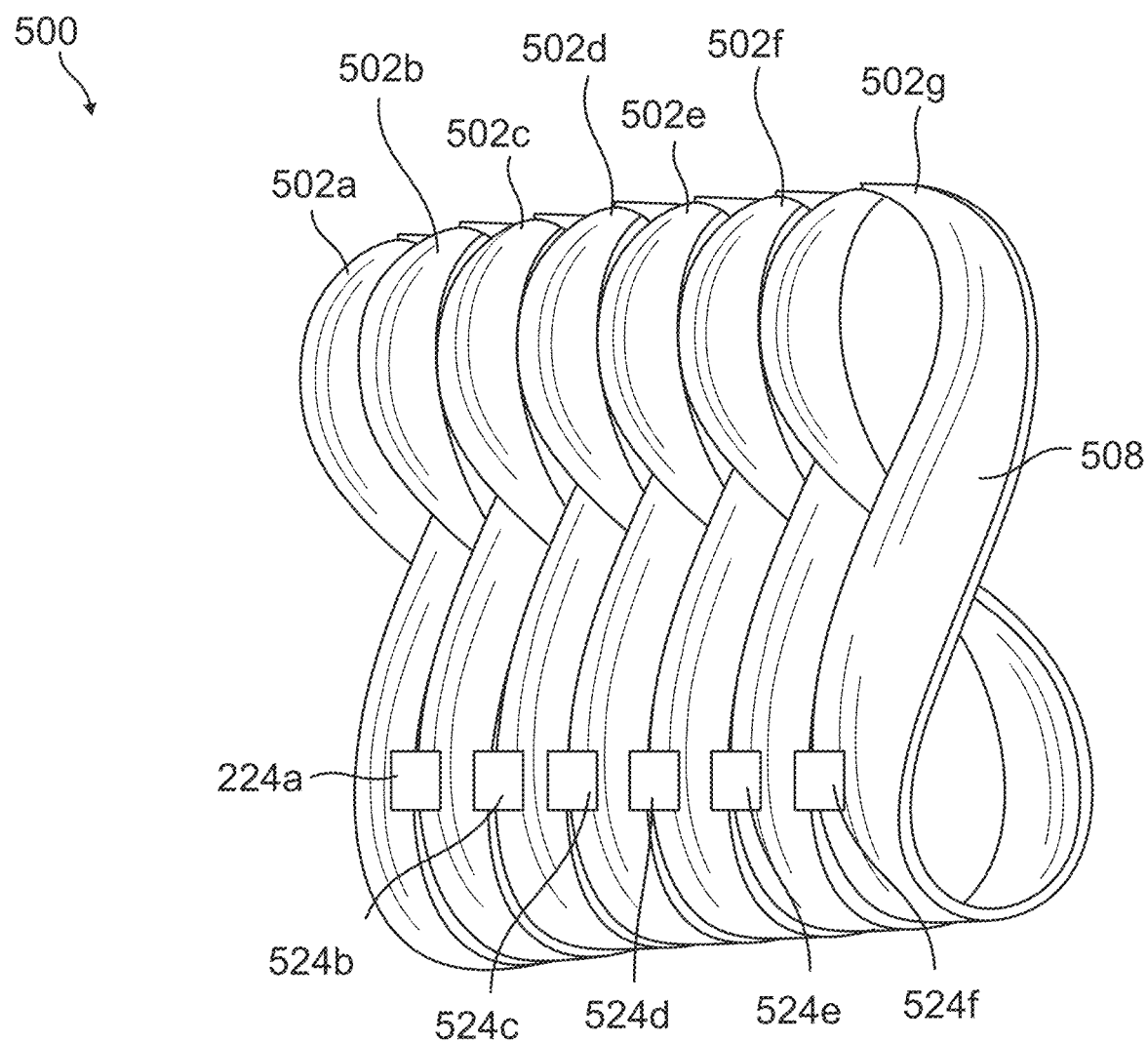
FIG. 5 illustrates an elevational view of an exemplary embodiment of a guideway of the launch system.

FIG. 5 illustrates an elevational view of an exemplary embodiment of a guideway 500 of the launch system 400. The guideway 500 includes a plurality of cylinders 502a-g. Though seven cylinders 502a-g are shown, more or less cylinders 502a-g may be implemented in the launch system 400. The plurality of cylinders 502a-g are coupled by a plurality of bridges 524a-f, such as a cylinder pathway, to form the guideway 500. For example, at least one cylinder pathway bridge 524a-f is positioned between each pair of adjacent cylinders 502a-g and connect the guideways 500 in each pair of the adjacent cylinders 502a-g.

In one embodiment, each of the cylinders 502a-g has an infinity type shape with a first lobe 512a and a second lobe 512b and an overlapping portion 508, wherein the cylinder 502a-g overlaps itself and connects the two lobes 512a-b. For example, the cylinders 502a-g have a cross-sectional plane that forms any one of several lemniscate-type shapes, also known as figure-eight shapes, such as a Booth-type lemniscate or a Gerono-type lemniscate. The lobes 512a-b of the cylinders may have an oval, teardrop, circular or other shape. In another embodiment, the cylinders 502a-g may resemble a three dimensional (3-D) Viviani's curve, wherein the lobes 512a-b are bent or curved with respect to the overlapping portion 508.

The plurality of cylinders 502a-g include a cylindrical casing that forms the at least two lobes 212a-b and the at least one overlapping portion 508. Though the lobes of the cylinders 502a-g are shown as equally sized in these examples, one lobe 212a may be longer than another lobe 212b. In addition, one lobe 212a of the cylinder 502a-g may have a first shape, such as a circle, oval, tear-drop or pear shape, and the other lobe 212b may have a second, different shape.

In other implementations, the cylinders 502a-g may have a Mobius strip type shape, e.g., a half-twist that is inserted between two attached ends of the cylinder 502a-g. The cylinders 502a-g may alternatively have a simpler shape, such as a torus. In these implementations, the cylinders 502a-g include a single lobe or loop.

The plurality of cylinders 502a-g are positioned adjacently (next to or touching) such that a first lobe 512a of a cylinder 502a-g is substantially aligned with the first lobes 512a of each of its adjacent cylinders 502a-g, and the second lobe 512b (if present) of a cylinder 502a-g is substantially aligned with the second lobe 512b of each of its adjacent cylinders 502a-g. By substantially aligned, the first lobes 512a of the plurality of cylinders 502a-g each form an external, continuous space that extends through the first lobe 512a of each of the plurality of cylinders 502a-g, and/or the second lobes 512b (if present) of the plurality of cylinders 502a-g each form another external, continuous space that extends through the second lobe 512b of each of the plurality of cylinders 502a-g.

And though the cylinders 502a-g are shown vertically in FIG. 5, e.g., the first lobe 512a of a cylinder 502a-g is positioned vertically with respect to its second lobe 512b, the cylinders 502a-g may be positioned horizontally. These exemplary configurations of the plurality of cylinders 502a-g increase the length of the guideway 500 within a limited area, e.g., within the capsule 200 of the airship 100. In one example of the dimensions, the cylinders 502a-g are approximately 100 meters (m) in height and have a length of approximately 84 m. In this example, each cylinder 502a-g forms approximately 250 m of the guideway 500, with the seven cylinders 502a-g forming a total length of 1,750 m. The capsule 200 has an approximate height of over 100 m with the airship 100 having a height of 300 m including the external structure 104. The cylinders 502a-g thus fit within the limited dimensions of the capsule 200 while still forming a lengthy guideway 500 of 1,750 m. This configuration of the guideway 500 thus provides an improvement in length within a confined area over other geometric shapes and configurations previously known for rail guns and launchers. The lengthy guideway 500 further allows for a controlled and gradual increase of speed for the vessel 410 while maintaining structural integrity for the launch system 400.

Adjacent cylinders 502a-g are coupled by at least one bridge 524a-f, such that a vessel 410 within the guideway 500 may move from one cylinder 502a-g to another, adjacent cylinder 502a-g over the bridge 524a-f. The cylinders 502a-g and the bridges 524a-f thus form a continuous guideway 500.

In one example, a lower portion of the cylinders 502a-g remains positioned within the capsule 200 and an upper portion of the cylinders 502a-g is positioned externally to the capsule 200. In another example, the cylinders 502a-g may be positioned entirely or substantially within the capsule 200. In another embodiment, the cylinders 502a-g may be positioned substantially external to the capsule 200.

Figure 6:
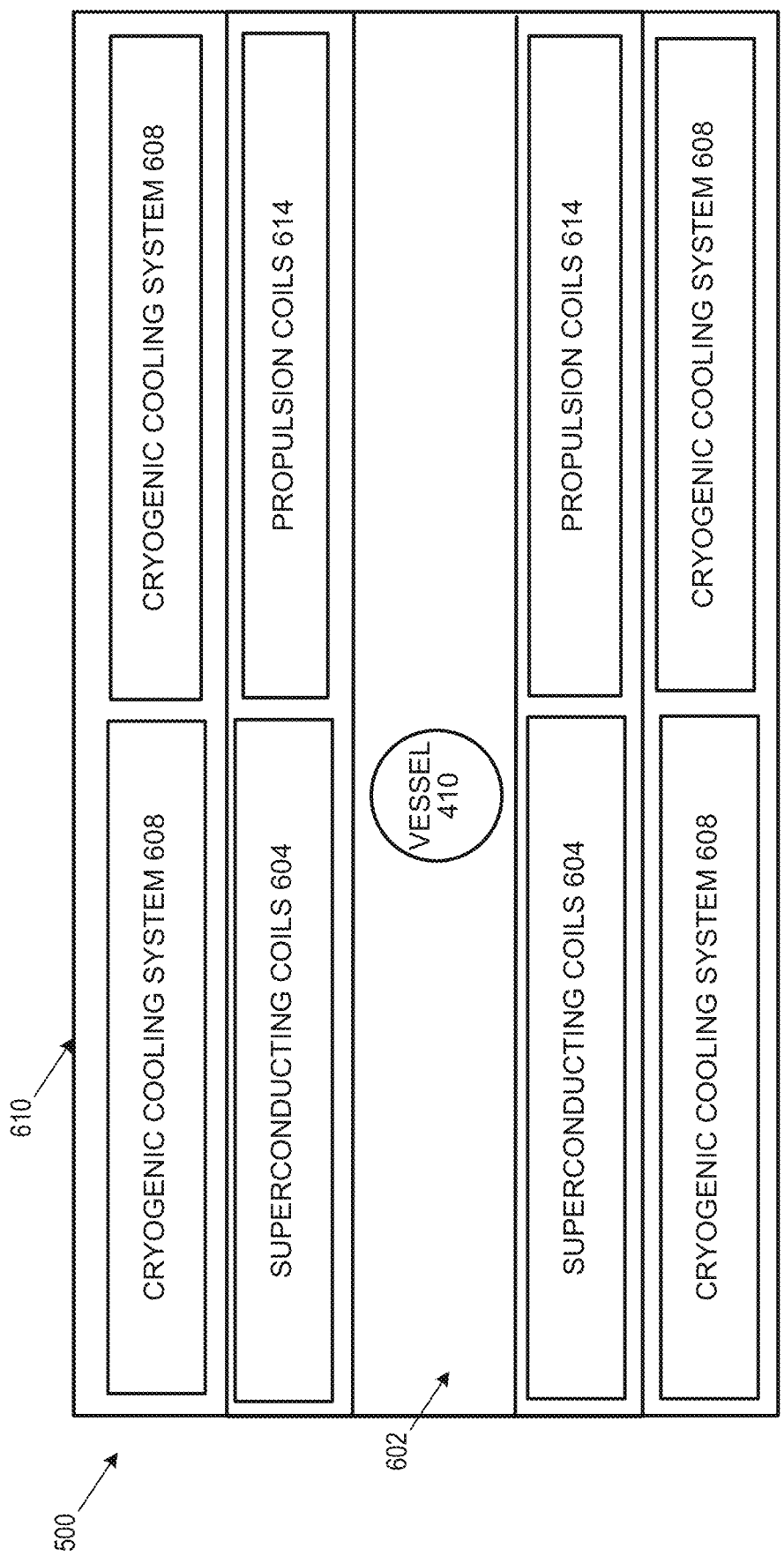
FIG. 6 illustrates a schematic block diagram of an exemplary embodiment of a cross-section of the guideway.

FIG. 6 illustrates a schematic block diagram of an exemplary embodiment of a cross-section of the guideway 500. The guideway 500 includes an interior bore 602 that forms a continuous passageway for the vessel 410 through the plurality of cylinders 502a-g and bridges 524a-f. The vessel 410 has a spherical or oval shape or other shape and size configured to travel through the guideway 500. In one example, the vessel 410 is circular with an approximate 5 m diameter and the bore 602 is cylindrical with an approximate 6 m diameter.

In one embodiment, a plurality of superconducting coils 604 are wrapped circumferentially around the bore 602 or otherwise positioned externally to the bore 602, wherein the coils 604 are configured to generate sufficient magnetic fields necessary for levitating the vessel 410. Superconductivity is a state in which certain materials exhibit zero electrical resistance. This unique property allows for the creation of powerful magnetic fields for levitating and/or accelerating the vessel 410 within the guideway 500. By controlling the strength and direction of these magnetic fields, the vessel 410 is levitated within the bore 602, e.g., such that the vessel 410 has little to no contact with surrounding walls or components.

The superconducting coils 604 comprise superconducting materials, such as niobium-tin and yttrium-barium-copper oxide, which exhibit superconducting properties at low temperatures, necessitating the use of cryogenic cooling system 608 to maintain the required conditions. The cooling system 608, e.g., including liquid helium and/or nitrogen, cools or reduces the temperature of the superconducting coils 604 to and/or below a transition temperature at which the superconducting material(s) in the coils 604 transition to a superconducting state. Additionally, the guideway 500 and/or bore 602 may be depressurized to a lower pressure than the pressure in the capsule 200 or the surrounding atmosphere. This vacuum lowers the air resistance and friction on the vessel 410 as it moves through the bore 602.

The launch system 400 controls a magnetic field, e.g., using flux pinning structures or other mechanisms, as the material in the superconducting coils 604 are cooled to the transition temperature. Superconductors have a flux-trapping property such that a magnetic flux will be trapped in the superconductor if it is present when the material crosses the transition temperature threshold between conducting and superconducting states. Moreover, once the superconductor material becomes superconducting, the superconductor will reject any further imposition of magnetic flux. This property is referred to as flux-exclusion. The aforementioned properties enable superconductors to function as powerful artificial magnets and facilitate efficient levitation and/or acceleration in the guideway 500. In one implementation, the superconducting material of the coils 604 has a trapped or persistent magnetic field sufficient to levitate the vessel 410 within the bore 602. In other implementations, the magnetic field control system does not generate a magnetic flux, and the superconducting coils 604 are transitioned to a superconducting state without a trapped magnetic flux.

In operation, the superconducting coils 604 generate a magnetic field around or in the walls of the bore 602. This magnetic field repels a surface and/or outer shell of the vessel 410 that has a polarization that is opposite to the magnetic field. The vessel 410 is then repelled by the magnetic field around the walls of the bore 602 and remains levitated within the bore 602 with little to no contact with the walls. In one example, the vessel 410 may include superconducting material, e.g., in the outer shell or surface, or in an inner layer or body. The surface 412 of the vessel 410 is partially or substantially coated with cryogenic liquid such that the vessel 410 is repelled by the magnetic field of the superconducting coils 604. Additionally or alternatively, electromagnetic (and possibly superconducting) coils in the vessel 410 may generate a magnetic field in or around a surface 412 of the vessel 410 in response to a current, e.g., from a battery in the vessel 410, traveling through the electromagnetic coils. The magnetic field generated by the vessel 410 or properties of the materials of the vessel 410 thus interacts with and is repelled by the magnetic field of the superconducting coils 604.

The guideway 500 includes an outer, cylindrical casing 610 that may be comprised of a strong, non-conducting material, such as concrete, plastics, carbon, carbon fiber, ceramic (material), fiberglass, or other non-magnetic materials. In one example, the bore 602 of the guideway 500 has a diameter that is approximately 6 meters (m) and the outer casing 610 is approximately 2 inches thickness. The radial distance between the outer casing 610 to the bore 602 is approximately 3 m and contains the electromagnetic coils 604, cooling system 608 and other components, such as flux pinning structures (not shown) or compensation coils (not shown).

In one embodiment, the guideway 500 includes a propulsion system having, e.g., one or more propulsion coils 614 (similar to the electromagnetic, superconducting coils 604) for controlling the velocity of the vessel 410. In one example, the propulsion coils 614 are separate from the superconducting coils 604 such that the superconducting coils 604 provide levitation of the vessel 410 within the bore 602 while the propulsion coils 614 control a speed of the vessel 410. In another example, the superconducting coils 604 include the propulsion coils 614a-d.

One or more strategically placed propulsion coils 614 on the guideway are used to exert an additional acceleration force on the vessel 410. For example, the propulsion coils 614a-d may be placed at a predetermined position within the guideway 500, such as a bottom portion or loop of a cylinder 502a. The propulsion coils 614 exert a booster force on the vessel 410 through a higher-powered electrical current in the propulsion coils 614 generating a stronger magnetic field to accelerate the vessel 410. The frequency and power of the current is synchronized to match with the return loop trip of the vessel 410 through the predetermined position of the propulsion coils 614. The interaction between the superconducting material on a surface, or in an outer layer or shell near the surface, of the vessel 410 and the applied booster pathway field creates an acceleration force moving the vessel 410 forward. The launch system 400 may then control the power or current to the propulsion coils 614 to increase and/or decrease the magnetic field generated by the propulsion coils 614 and so increase or decrease a velocity of the vessel 410. In an embodiment, the propulsion coils 614 may comprise superconducting material and be cooled to superconductivity by the cooling system 608.

In operation, the launch system 400 determines a position of the vessel 410 within the guideway 500 and activates one or more of the propulsion coils 614 as the vessel 410 approaches and/or moves away from the activated one or more propulsion coils 614. When the bore 602 is depressurized, little to no air resistance may exist to slow the vessel 410 as it travels through the guideway 500 such that the vessel 410 maintains its approximate speed induced by the propulsion coils 614. When air resistance is present, additional propulsion coils 614 may be positioned in the guideway 500 to maintain and/or increase the speed of the vessel 410 through the guideway 500.

The implementation of the superconducting magnets and guideway 500 herein are exemplary. Further details and/or alternative embodiments are described in the article: Toral, Fernando. "Mechanical design of superconducting accelerator magnets." arXiv preprint arXiv:1501.02932 (2015), the entirety of which is hereby incorporated by reference herein.

Figure 7:
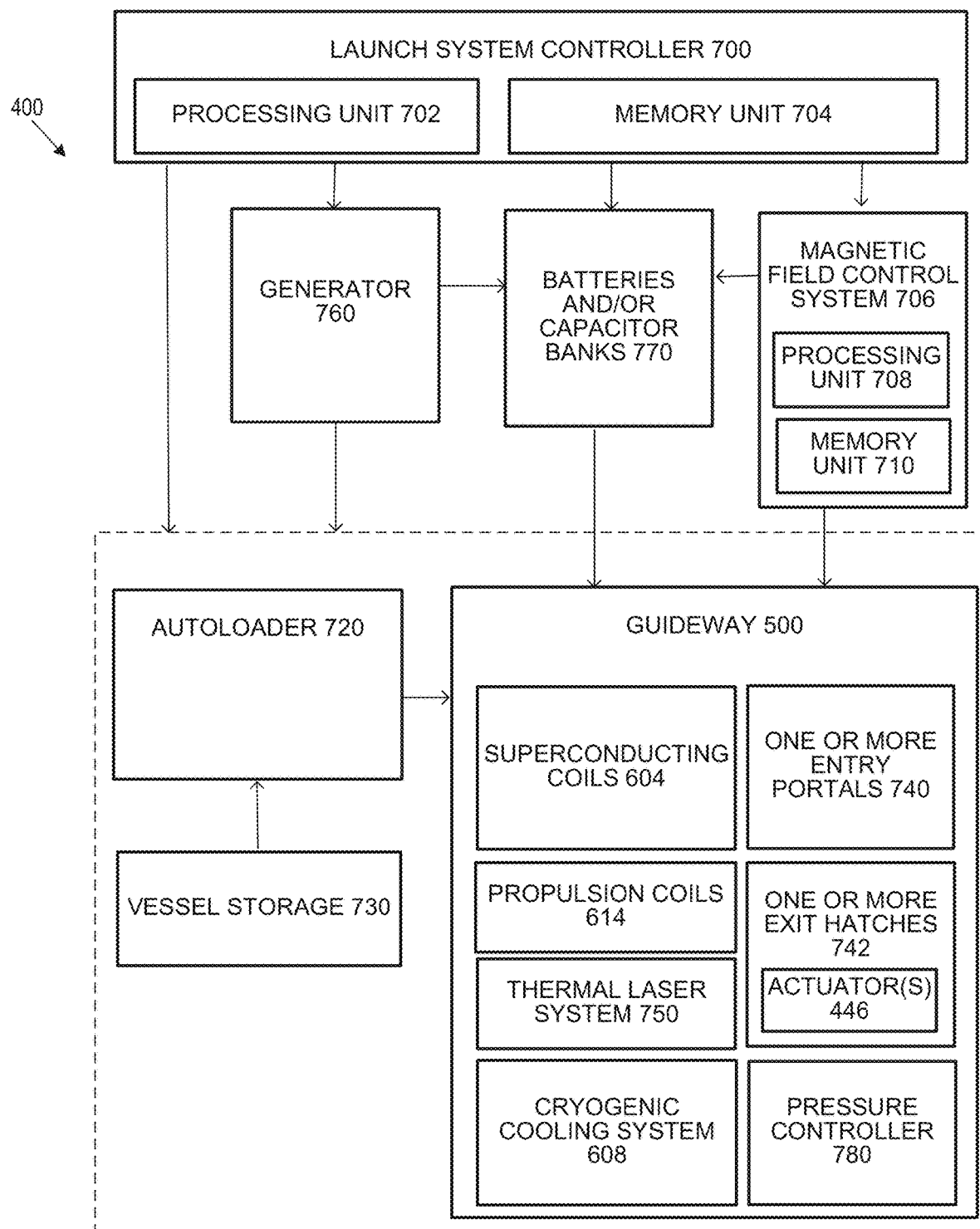
FIG. 7 illustrates a block diagram of an exemplary embodiment of the launch system.

FIG. 7 illustrates a block diagram of an embodiment of the launch system 400. The launch system 400 includes at least one launch system controller 700 having at least one processing unit 702 and at least one memory unit 704. The processing unit 702 includes at least one processor, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The memory unit 704 includes at least one non-transitory memory device that is internal or external to the processing unit 702. The memory unit 704 may include a single memory device or a plurality of memory devices. The at least one memory device may be a read-only memory, random access memory, volatile memory, non-volatile memory, static memory, dynamic memory, flash memory, cache memory, and/or any non-transitory memory device that stores digital information and is readable by the processing unit 702.

The memory unit 704 stores computer-executable instructions which when executed by the processing unit 702, causes the launch system 400 to perform one or more functions described herein. The computer-executable instructions may include, e.g., program modules such as routines, programs, objects, components, data structures, etc. that perform particular tasks or implement particular abstract data types. Such instructions may be implemented in a high-level procedural or object-oriented programming language to communicate with a computer system. However, the program(s) can be implemented in assembly or machine language, if desired. In any case, the language may be a compiled or interpreted language, and combined with hardware implementations.

The launch system 400 may include a separate magnetic field control system 706 to operate the superconducting coils 604, propulsion coils 614, pressure controller 780, or other additional or alternative components. In another implementation, the launch system controller 700 may perform one or more operations described herein with respect to the magnetic field control system 706. The magnetic field control system 706 may also include a processing unit 708 and memory unit 710. The memory unit 710 stores computer-executable instructions which when executed by the processing unit 708, causes the guideway 500 and/or other components to perform one or more functions described herein.

The launch system 400 may further include one or more capacitor banks and/or batteries 770 or other power source for powering the guideway 500, and in specific the superconducting coils 604 and the one or more propulsion coils 614. A generator 760 may charge or power the capacitor bank and/or batteries 770, e.g., using hydrogen or other fuel. The propulsion coils 614 may comprise the superconducting coils 604 and/or separate propulsion coils 614 and/or other mechanisms to accelerate the vessel 410 within the guideway 500.

In one embodiment, the guideway 500 may include one or more entry portals 740 and one or more exit hatches 742. An autoloader 720 may load one vessel 410 or a plurality of vessels into one or more entry portals 740. For multiple vessels 410, the magnetic field control system 706 may maintain a same speed for the plurality of vessels 410 in the guideway. The plurality of vessels 410 will thus travel through the guideway 500 without collision. The plurality of vessels 410 may then be launched from the guideway 500 through one or more exit hatches 742. Actuators 746 at the one or more exit hatches 742 may be adjusted to adjust a launch angle in response to the predetermined flight trajectory or pathway of the vessel 410. In one example, the actuators 746 may adjust a launch angle of the vessel 410 from 75 degrees to 105 degrees.

The guideway 500, as discussed herein, may have a lower pressure than the other parts of the airship 100. The pressure controller 780 operates to lower the pressure in the guideway 500, such as in the bore 602, to match the air pressure in the surrounding stratosphere, e.g., between 2.9 pounds per square inch (psi) and 0.014 psi. In other embodiments, the pressure controller 780 may lower the air pressure further to the lower air resistance on the vessel 410. The pressure controller 780 may also operate to pressurize the airship 100 as it ascends. In general, a pressurization of 11 pounds per square inch (psi) is maintained for a manned aircraft.

The launch system 400 may further include a thermal laser system 750 that generates one or more laser beams into a flight trajectory or pathway of the vessel 410 after launch. The launch system controller 700 determines a flight trajectory or path for a vessel 410 after launch from the guideway 500. The thermal laser system 750 generates one or more laser beams into the atmosphere that at least partially or substantially intersect the determined flight trajectory of the vessel 410. The one or more laser beams create a tube or pathway of warm air within the cold temperatures of the stratosphere. This warm air assists the speed and direction (e.g., maintaining a desired launch angle) of the vessel 410. Also, the warm air helps the vessel 410 transition from the vacuum of the bore 602 into the more pressurized atmosphere of the stratosphere.

A vessel storage 730 is configured to store one or more vessels 410. An autoloader 720 retrieves one or more vessels 410 from the vessel storage 730 and loads the one or more vessels into the guideway 500. In one embodiment, the vessel storage 730 is located in the outriggers 110 of the airship 100. The vessels 410 may be equally distributed among the outriggers to maintain balance of the airship 100 while also adding weight and ballast. For launching, the autoloader 720 obtains one vessel from each outrigger to maintain a balance in weight of the outriggers 110. In one example, e.g., the airship 100 includes four outriggers 110 with each outrigger 110 storing three vessels 410. To launch four vessels 410, the autoloader 720 obtains one vessel 410 from each outrigger 110.

Figure 8:
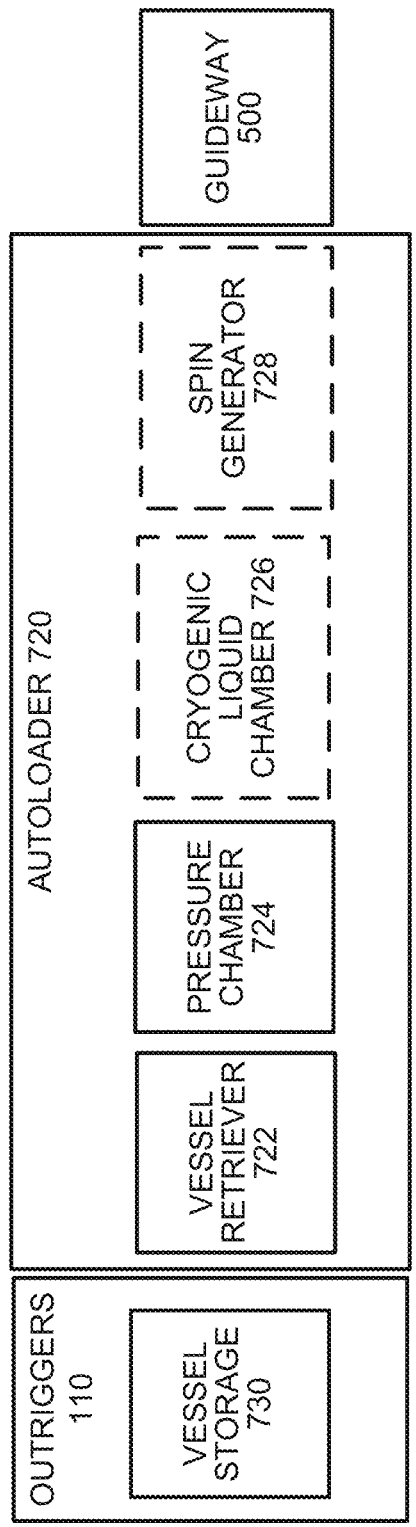
FIG. 8 illustrates a schematic block diagram of an embodiment of the autoloader.

FIG. 8 illustrates a schematic block diagram of an embodiment of the autoloader 720. The autoloader 720 includes a vessel retriever 722 that obtains a vessel 410 from the vessel storage 730, e.g., located in one of the outriggers 110. The vessel retriever 722 may include an arm or boom that swivels about a main post or other structure to a vicinity at or near a vessel 410 in the vessel storage 730. A robot, robot arm, conveyor belt, or other mechanisms may then place the vessel 410 into or on or otherwise attach the vessel 410 to the arm or boom of the vessel retriever 722. The vessel retriever 722 then propels or carries or otherwise transports the vessel 410 through the attached boom 106 of the outrigger 110.

The autoloader 720 may further include a pressure chamber 724 configured to adjust between a pressure of the vessel storage 730 and the pressure in the guideway 500. The pressure chamber 724 may be positioned in the capsule 200. For example, in the stratosphere, the outrigger 110 may be at 0.014 psi (pressure in the stratosphere) and the bore 602 may be at a lower pressure. The vessel 410 enters the pressure chamber 724 at a pressure of the vessel storage 730 and the pressure controller 780 lowers the pressure in the chamber to approximately the pressure of the bore 602 (within a tolerance of +/−10%).

The autoloader 720 may further include a chamber 726 with a cryogenic liquid. If the vessel 410 does not include magnetized components, or to strengthen the magnetism of the vessel 410, the vessel 410 is coated in a cryogenic liquid that forms a layer over a surface of the vessel 410. For example, the cryogenic liquid may comprise cryogenic liquid nitrogen. Though liquid nitrogen is not magnetic in normal conditions, nitrogen molecules are repelled by a magnetic field. The surface of the vessel 410 will thus be at least partially or substantially coated with the cryogenic, liquid nitrogen. As such, the magnetic field of the superconducting coils 604 in the bore 602 will repel the nitrogen molecules and levitate the coated vessel 410. Additionally or alternatively, electromagnetic, superconducting coils in the vessel 410 are cooled by the cryogenic liquid and may generate a magnetic field in or around a surface of the vessel 410, e.g., in response to a current from a battery in the vessel 410. The magnetic field generated by the vessel 410 interacts with and is repelled by the magnetic field of the superconducting coils 604 in the guideway 500. Additionally or alternatively, the surface of the vessel 410 may include a ferromagnetic material that repels the magnetic fields of the superconducting coils 604 in the guideway 500. Such a ferromagnetic shelled vessel 410 is not coated with the cryogenic liquid.

The autoloader 720 may further include a spin generator 728 that spins the vessel 410 prior to entering the guideway 500. For example, the vessel 410 may include a spherical or bullet or football type structure that may obtain lift or other benefits from spinning during flight. The spin generator 728 initiates spin of the vessel 410. Within the guideway 500, the superconducting coils 604 and/or propulsion coils 614 and/or or other mechanism may maintain or increase the rotational spin of the vessel 410.

Figure 9:
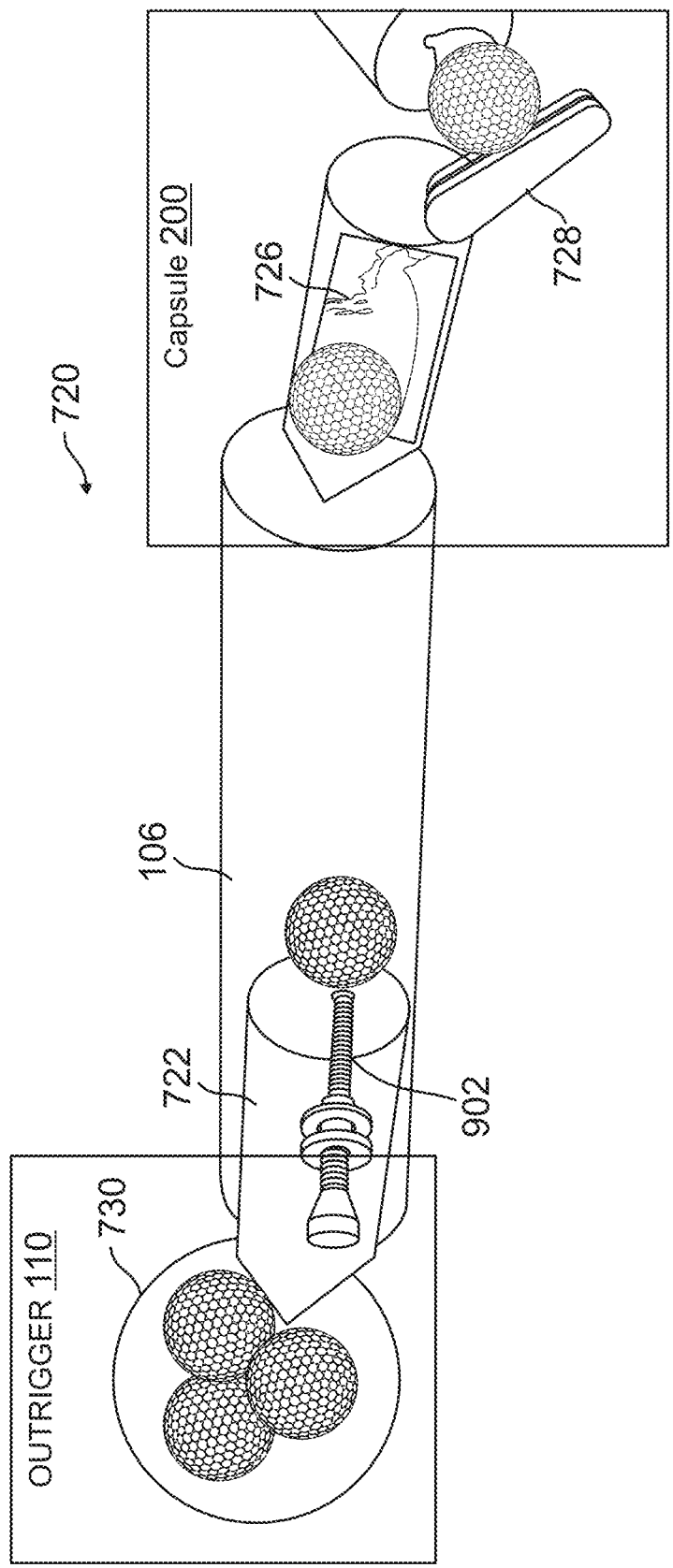
FIG. 9 illustrates an elevational view of an embodiment of the vessel storage in one of the outriggers and the autoloader.

FIG. 9 illustrates an elevational view of an embodiment of the vessel storage 730 in one of the outriggers 110 and the autoloader 720. The launch system controller 700 determines a number of vessels 410 that are to be loaded into the guideway 500 at a same time. The autoloader 720 obtains this number of vessels 410 from the outriggers 110 in a distributed manner to maintain a relative weight balance between the outriggers 110. In this example, the outriggers 110 store three vessels 410 though fewer or more vessels 410 may also be implemented.

In operation, the vessel retriever 722 propels a vessel 410 from the vessel storage 730 in an outrigger 110, through the attached boom 106, e.g., using a spring 902 or other mechanism. The boom 106 forms a hollow pathway for the vessel 410 to move to the capsule 200. The first vessel 410 reaches the capsule 200 and is transported through the pressure chamber 724 and/or cryogenic liquid chamber 726. A spin generator 728, such as a flipper accelerator or other lever, initiates spin of the first vessel 410 and/or propels the vessel into an entry portal 740 of the guideway 500.

The autoloader 720 may then load a second vessel 410 from a second, different outrigger 110 into the same entry portal 740 or a different second entry portal. The autoloader 720 may then load a third vessel 410 from a third outrigger 110 into the same first entry portal 740 or into a third entry portal. For example, the first entry portal 740 may be located on a first end cylinder 502a of the plurality of cylinders 502a-g, the second entry portal 740 may be located on the fourth or middle cylinder 502d, and the third entry portal 740 may be located on a second end cylinder 502g. In another embodiment, multiple autoloaders 720 may be implemented to load the vessels 410 into one or more of the entry portals 740.

The vessel 410 in FIG. 9 is illustrated as a sphere with a plurality of dimples. This embodiment of the vessel 410 is described in more detail in U.S. patent application Ser. No. 18/664,116, filed May 14, 2024, entitled, "SYSTEM AND METHOD FOR DIMPLED SPHERICAL STORAGE UNITS," by inventor Thomas F. Yost, the entirety of which is incorporated by reference herein. In other embodiments, the vessel 410 may include a sphere without dimples or a substantially spherical structure, or be formed in an oval-type shape or bullet-type shape. The vessel 410 may have an approximate 5 m diameter or length or other shape or size configured to travel through the bore 602 of the guideway 500.

Figure 10:
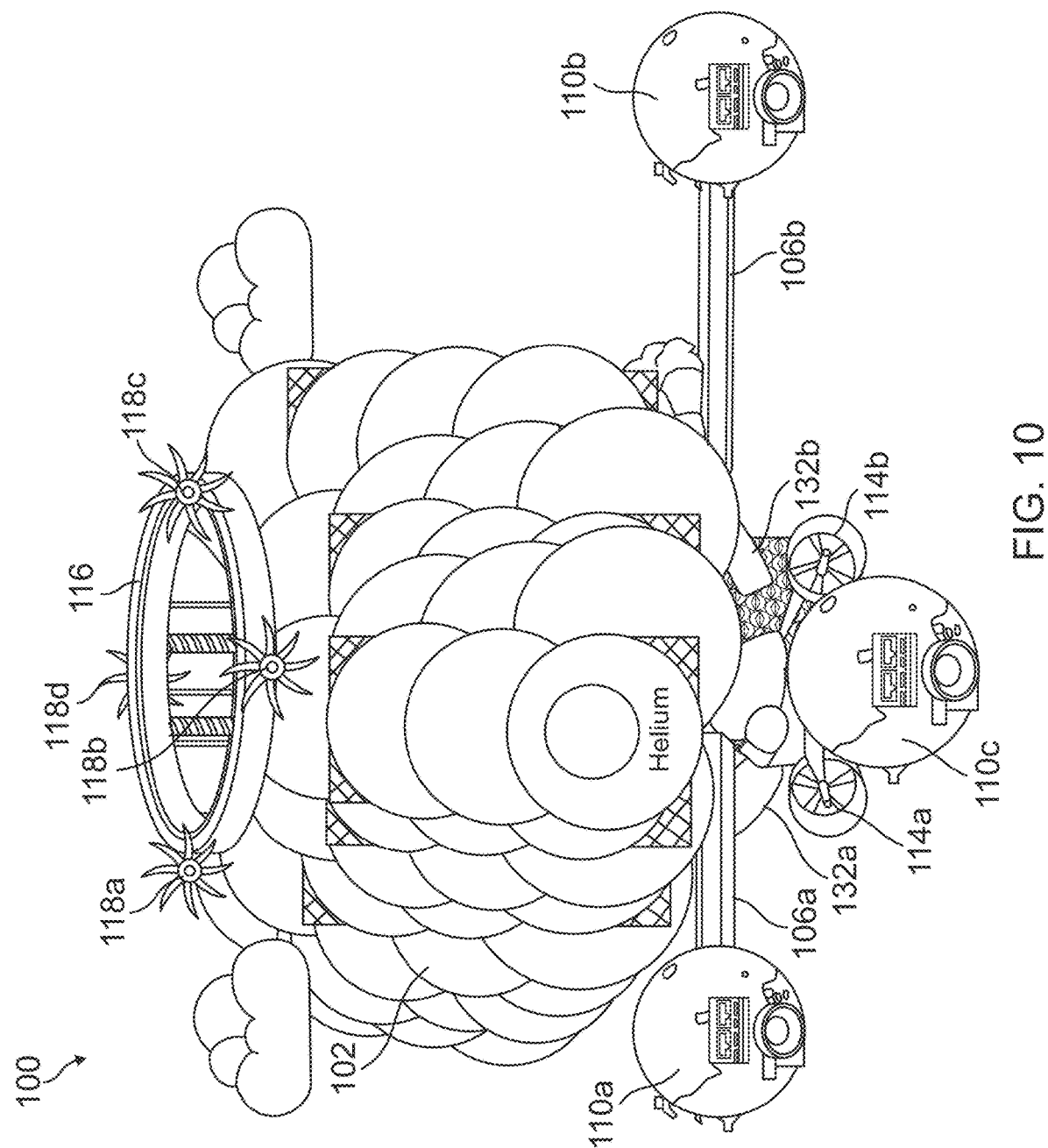
FIG. 10 illustrates an elevational view of an exemplary embodiment of the airship in flight mode with a boom stability adjustment system.

FIG. 10 illustrates an elevational view of an exemplary embodiment of the airship 100 in flight mode with a boom stability adjustment system. The stability of the airship 100 is important during flight and when launching a vessel 410 or performing other tasks. Another method for stability control is to adjust one or more of the booms 106. In this embodiment, the booms 106a-b are a same component comprising an extended pole or cylinder slidably attached to the capsule 200. In an unlocked mode, a nut or other holder (not shown) unlocks and a hydraulic system slides the boom 106 horizontally from a first side of the capsule 200 to the opposite side of the 200, such that a first side of the boom 106a on the first side is shorter than a second side of the boom 106b on the opposite side. The holder may then relock the boom 106 into place. A gyroscopic stabilizer control system (e.g., as part of the launch system controller 700) may measure an angular velocity of the airship 100 and automatically adjust the boom 106 to slide from one side to another. The system may also adjust one or more of the upper propellers 118a-c, the tiltrotor propellers 114a-b, vanes (not shown), or other stabilizers. Though only one boom 106a-b is adjusted in FIG. 10, a second perpendicular boom 106 may be adjusted as well.

The plurality of gas balloons 102 include a lighter than air lifting gas such as helium. Helium is preferred to hydrogen due to its lower flammability. However, the airship 100 may include containers 132a-b of hydrogen as fuel for the generator 760. These containers 132a-b may be bags, balloons or metal cannisters.

Figure 11:
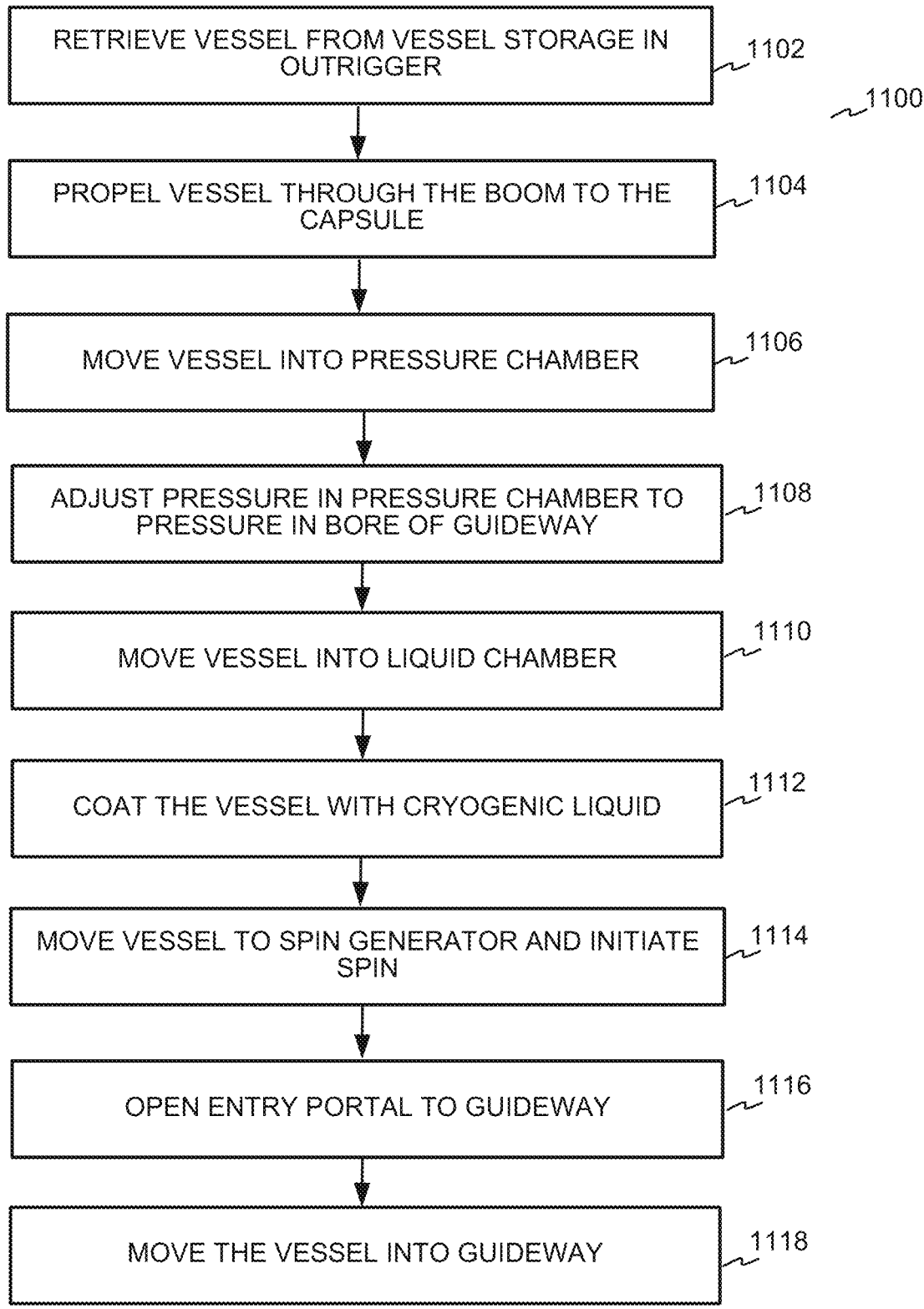
FIG. 11 illustrates a flow diagram of an embodiment of a method for loading a vessel into the guideway.

FIG. 11 illustrates a flow diagram of an embodiment of a method 1100 for loading a vessel 410 into the guideway 500. At 1102, a vessel 410 from vessel storage 730 in one of the outriggers 110 is selected and retrieved from a vessel storage 730. The vessel 410 may be selected to maintain a distribution of weight between the outriggers 110 and/or due to its cargo or functionality. At 1104, the vessel retriever 722 propels the vessel through the attached boom 106 to the capsule 200. At 1106, the vessel 410 is moved into a pressure chamber 724. At 1108, the pressure in the pressure chamber 724 is adjusted to approximately a pressure of the bore 602 in the guideway 500. At 1112, the vessel 410 is coated, at least partially or substantially, with a cryogenic liquid, such as cryogenic, liquid nitrogen. At 1114, the vessel 410 is moved to a spin generator 728 that initiates the vessel 410 to spin. At 1116, the entry portal to the guideway 500 is opened, and at 1118, the vessel 410 is moved into the guideway 500.

One or more of these steps described with respect to FIG. 11 may not be performed. For example, the vessel 410 may not be moved to the pressure chamber and/or the pressure not adjusted in the pressure chamber when the vessel storage 730 is at an approximately same pressure as the bore 602 of the guideway 500. In addition, the vessel 410 may not be moved to a liquid chamber or coated with a magnetic liquid when the vessel 410 includes magnetic components, such as magnets or electromagnetic coils. Further, the vessel 410 may not be moved to a spin generator when no spin is preferred for the vessel 410.

Figure 12:
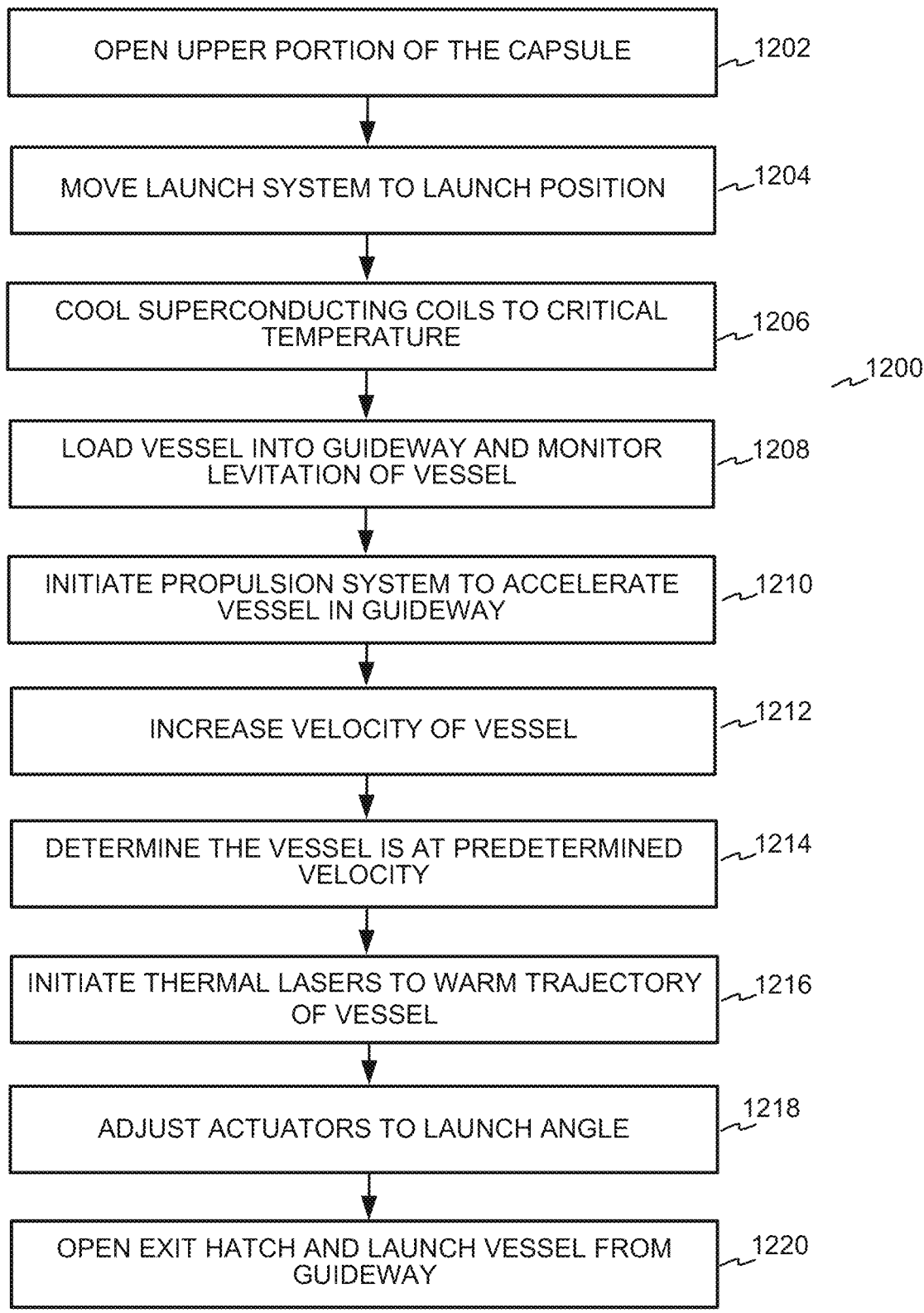
FIG. 12 illustrates a flow diagram of an embodiment of a method for launching a vessel from the guideway.

FIG. 12 illustrates a flow diagram of an embodiment of a method 1200 for launching a vessel 410 from the guideway 500. The airship 100 ascends to a predetermined altitude in the stratosphere, e.g., an altitude between 12 km and 50 km, and stabilizes its altitude and tilt. At 1202, the upper portion 420 of the capsule 200 is opened, and at 1204, the launch system 400 is moved into a launch position such that an exit hatch 742 on the guideway 500 may launch the vessel 410 through the open air shaft 210. At 1206, the superconducting coils 604 are cooled to a transition temperature for superconductivity. At 1208, the vessel 410 is loaded into the guideway 500, and levitation of the vessel 410 within the bore 602 is confirmed and monitored. At 1210, the propulsion system 448, such as the propulsion coils 614 and/or the superconducting coils 604, accelerate the vessel in the guideway 500. At 1212, the velocity of the vessel 410 is increased until at 1214, the vessel 410 is determined to reach a predetermined velocity, e.g., such as an escape velocity necessary to reach space. The predetermined velocity may be determined using one or more factors, such as an altitude of the airship 100, air pressure, temperature, wind speed, trajectory of the vessel 410, or planned use of thrusters on the vessel 410.

At 1216, thermal lasers are initiated to warm a determined flight trajectory or pathway of the vessel 410. At 1218, actuators 746 at the exit hatch 742 are adjusted to a predetermined launch angle in response to the determined flight trajectory or pathway of the vessel 410 and/or guide the vessel 410 to launch through the open air shaft 210. In one example, the actuators 746 may adjust a launch angle of the vessel 410 from 75 degrees to 105 degrees. At 1220, the exit hatch 742 is opened and the vessel 410 is launched from the guideway 500 at the launch angle. Due to the length of the guideway 500, the exit hatch 742 has sufficient time to open. For example, if the vessel 410 is traveling at Mach 2.5 to Mach 5 in the guideway 500, and the guideway is approximately 1,750 m, the vessel 410 travels from the far side of the guideway 500 to the exit hatch 742 in approximately one second; time enough to open the exit hatch 742. The tiltrotor propellers 114a-b may tilt downwards to provide an upper thrust or lift to counteract a downward force generated by the launch of the vessels 410. After the mission is complete, the airship 100 may release lifting gas from one or more of the balloons 102 and be guided back to its launchpad or splashdown in the water protected by capsule 200 and external structure 104.

In one embodiment, the predetermined velocity and/or flight trajectory of the vessel 410 are sufficient for the vessel 410 to reach space, e.g., to reach at least an 80 km altitude above Earth (US NOAA and Military definition of space) or to reach a 100 km altitude (international community definition of space). In another embodiment, the predetermined velocity and/or flight trajectory are insufficient for the vessel 410 to reach space. The vessel 410 may include thrusters to gain further altitude and/or adjust its trajectory.

The launch system 400 reduces the escape velocity necessary for the vessel 410 to reach space in comparison to traditional rockets or rail guns located on the ground for several reasons. First, the airship 100 launches the vessel 410 from the stratosphere, and the vessel 410 may further include thrusters to assist the vessel 410 in reaching space. Second, in one embodiment, the vessel 410 includes dimples and/or has spin that provide additional lift. Third, the launch angle of the vessel 410 may be adjusted for a shorter pathway or trajectory to reach its desired altitude and position. These advantages of the launch system 400 are exemplary and additional and/or alternate advantages may exist.

In addition to airships, the launch system 400 may be implemented on an airplane configured to fly to the stratosphere, or on a tilt-rotor aircraft, such as Bell Boeing V-22 Osprey®, which can fly like a helicopter and an airplane. In addition, some helicopters can reach altitudes in the lower stratosphere of approximately 12 km. In other embodiments, the launch system 400 may be used on the airship 100 at altitudes below 12 km. In this implementation, depending on the altitude of the airship 100, the guideway 500 accelerates the vessel 410 to a speed necessary to reach a selected altitude, e.g., an altitude within the stratosphere or further. When launched at lower altitudes, the thrusters on the vessel 410 may also be used to reach a selected altitude or space.

In one application, the vessels 410 are launched into space to provide cargo for building a moon base: food supplies, mining equipment, reactor parts, oxygen, greenhouses, plants, concrete, soil, fertilizer, oxygen, water, drilling equipment, pipes and reactor parts and water filtration. The launch system 400 and vessel 410 may thus provide the transport into the Solar System the materials needed to build a city's water & food supplies, infrastructure, shelter, and power plants to bring light & electricity for new settlements on the Moon or even on Mars. The cargo may further include components for a launch system 400 and/or vessel 410 that can be implemented on the Moon. The launch system 400 may then launch the vessel 410 from the Moon to Earth. The vessel 410 may orbit Earth for pick-up by a spaceship or space shuttle. In another embodiment, the vessel 410 is configured to withstand re-entry into Earth's atmosphere. The vessel 410 may include cargo such as Helium-3 (an isotope needed for clean nuclear fusion). In an embodiment, the vessel may dock with a shipyard, such as the hexagon spiderweb shipyard described in U.S. patent application Ser. No. 18/663,355, filed May 14, 2024, entitled, "SYSTEM AND METHOD FOR A SPACECRAFT DOCKING STATION," by inventor Thomas F. Yost, the entirety of which is incorporated by reference herein. The dockyard may include robots or other means to configure the vessels 410 for docking with another space vehicle or for transfer as cargo within another space vehicle or for reentry to Earth.

As may be used herein, the term "operable to" or "configurable to" indicates that an element includes one or more of components, dimensions, circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled," "coupled to," "connected to" and/or "connecting" or "interconnecting" includes direct connection or indirect connection through one or more other intervening components. As may further be used herein, inferred connections (i.e., where one element is connected to another element by inference) includes direct and indirect connection between two items in the same manner as "connected to." As may be used herein, the terms "substantially" and "approximately" provides an industry-accepted tolerance for its corresponding term and/or relativity between items.

Note that the aspects of the present disclosure may be described herein as a process that is depicted as a schematic, a flow chart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects have been described with reference to specific examples. Various modifications and changes may be made, however, without departing from the scope of the present invention as set forth in the claims. The specification and figures are illustrative, rather than restrictive, and modifications are intended to be included within the scope of the claims. Accordingly, the scope of the claims should be determined by the descriptions herein and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

The invention claimed is:

1. An airship, comprising:
    a capsule;
    at least a first boom extending substantially horizontally outward from a lower portion of a first side of the capsule;
    a first outrigger positioned at or near a far end of the first boom;
    at least a second boom extending substantially horizontally outward from a lower portion of a second, opposite side of the capsule, wherein the second boom is parallel to the first boom;
    a second outrigger positioned at or near a far end of the second boom, wherein the first outrigger and the second outrigger hold cargo;
    an external structure attached to the capsule and extending vertically above an upper portion of the capsule; and
    a plurality of gas balloons secured to the external structure and positioned externally to the external structure, wherein the plurality of gas balloons hold a lighter-than-air lifting gas and include at least a predetermined volume of the lifting gas to lift the airship into a predetermined altitude above Earth.

2. The airship of claim 1, wherein a number and/or a size of the plurality of gas balloons secured externally to the external structure is adjustable to obtain the predetermined volume of lifting gas sufficient to lift the airship into the predetermined altitude above the Earth.

3. The airship of claim 2, wherein the predetermined altitude above the Earth is in a stratosphere and wherein an average density of the lifting gas in the plurality of gas balloons is a same density as air in the stratosphere and generate a float altitude of the airship in the stratosphere above the Earth.

4. The airship of claim 1, further comprising:
    at least a third boom extending substantially horizontally outward from a lower portion of a third side of the capsule, wherein the third boom is perpendicular to the first boom and the second boom;
    a third outrigger positioned at or near a far end of the third boom;
    at least a fourth boom extending substantially horizontally outward from a lower portion of a fourth side, opposite to the third side of the capsule, wherein the fourth boom is perpendicular to the first boom and the second boom and parallel to the third boom; and
    a fourth outrigger positioned at or near a far end of the second boom.

5. The airship of claim 1, further comprising:
    at least one tiltrotor propeller configured to tilt in one or more directions to steer the airship.

6. The airship of claim 1, wherein the external structure comprises:
    a plurality of stanchions, each including a first end attached to and supported by the capsule, wherein the plurality of stanchions extend vertically above the upper portion of the capsule; and
    a top ring positioned above the capsule and supported by a second end of the plurality of stanchions.

7. The airship of claim 6, wherein the external structure further comprises:
    a plurality of ropes, each with a first end supported and attached to the top ring and a second end attached to the capsule; and
    wherein the plurality of gas balloons are coupled to the plurality of ropes and/or the plurality of stanchions and extend externally outward from the external structure.

8. The airship of claim 1, wherein a length that the first boom extends horizontally outward from the lower portion of the first side of the capsule may be adjusted by sliding the first boom towards or away from the second boom.

9. The airship of claim 8, wherein the first boom and the second boom are a same structure and/or are attached.

10. The airship of claim 1, wherein the capsule comprises:
    a lower portion; and
    an upper portion, wherein the upper portion is configured to open and expose an internal portion of the capsule.

11. The airship of claim 10, wherein the internal portion of the capsule includes a launching system for launching a vessel from the airship.

12. The airship of claim 11, wherein the launch system for launching the vessel, comprises:
    a plurality of cylinders that form a continuous guideway, wherein each of the plurality of cylinders include at least one lobe and one overlapping portion, wherein the at least one lobe of each of the plurality of cylinders are substantially aligned;
    a plurality of coils that comprise one or more superconducting materials, wherein the plurality of coils are positioned externally to a bore in the guideway and configured to generate a magnetic field within the bore that levitates and propels the vessel within the bore; and
    a cooling system configured to cool the plurality of coils to or below a transition temperature at which the one or more superconducting materials in the plurality of coils transition to a superconducting state.

13. The airship of claim 12, wherein the one or more of the plurality of coils include propulsion coils that include the one or more superconducting materials, wherein the propulsion coils are configured to generate a magnetic field at a predetermined position in the bore to accelerate the vessel.

14. The airship of claim 11, wherein the launch system comprises:
at least one exit hatch for launching the vessel from the launch system, wherein the at least one exit hatch is positioned to launch the vessel internally through an open shaft formed by the external support and shielded by the plurality of gas balloons.

15. A stratospheric airship including a launch system for launching one or more vessels, comprising:
a capsule, wherein the capsule holds the launch system for launching the one or more vessels;
an external structure attached to the capsule and extending vertically above an upper portion of the capsule, wherein an interior of the external structure forms an open air shaft from the capsule to the atmosphere; and
a plurality of gas balloons secured externally to the external structure and extend outward from the external structure, wherein the plurality of gas balloons hold a lighter-than-air lifting gas and a number and a size of the plurality of balloons are configured to include at least a sufficient volume of the lifting gas to lift the airship into an altitude of at least 12 kilometers (km).

16. The stratospheric airship of claim 15, further comprising:
at least a first boom extending horizontally outward from a lower portion of a first side of the capsule;
a first outrigger positioned at or near a far end of the first boom, wherein the first outrigger holds at least a first vessel;
at least a second boom extending horizontally outward from a lower portion of a second, opposite side of the capsule; and
a second outrigger positioned at or near a far end of the second boom, wherein the second outrigger holds at least a second vessel.

17. The stratospheric airship of claim 16, wherein the first boom includes a first pathway from the first outrigger to the capsule; and
wherein the second boom includes a second pathway from the second outrigger to the capsule.

18. The stratospheric airship of claim 15, wherein the capsule comprises:
a lower portion; and
an upper portion, wherein the upper portion is configured to open and expose an internal portion of the capsule including the launch system.

19. The stratospheric airship of claim 15, wherein the launch system for launching the vessel, comprises:
a plurality of cylinders that form a continuous guideway, wherein each of the plurality of cylinders include at least one lobe and one overlapping portion, wherein the at least one lobe of each of the plurality of cylinders are substantially aligned;
a plurality of coils that comprise one or more superconducting materials, wherein the plurality of coils are positioned external to a bore in the guideway and configured to generate a magnetic field within the bore that levitates and propels the vessel within the bore; and
a cooling system configured to cool the plurality of coils to or below a transition temperature at which the one or more superconducting materials in the plurality of coils transition to a superconducting state.

20. The stratospheric airship of claim 19, wherein the one or more of the plurality of coils include propulsion coils that include the one or more superconducting materials, wherein the propulsion coils are configured to generate a magnetic field at a predetermined position in the bore to accelerate the vessel.

* * * * *